US008699103B2

(12) United States Patent
Mestha et al.

(10) Patent No.: US 8,699,103 B2
(45) Date of Patent: Apr. 15, 2014

(54) SYSTEM AND METHOD FOR DYNAMICALLY GENERATED UNIFORM COLOR OBJECTS

(75) Inventors: Lalit K. Mestha, Fairport, NY (US); Yao Rong Wang, Webster, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2087 days.

(21) Appl. No.: 11/170,946

(22) Filed: Jun. 30, 2005

(65) Prior Publication Data
US 2006/0285135 A1 Dec. 21, 2006

Related U.S. Application Data

(60) Provisional application No. 60/690,708, filed on Jun. 15, 2005.

(51) Int. Cl.
*H04N 1/60* (2006.01)
(52) U.S. Cl.
USPC .............................. 358/504; 358/1.9; 358/518
(58) Field of Classification Search
USPC ............................................ 358/1.9, 504, 518
See application file for complete search history.

(56) References Cited

U.S. PATENT DOCUMENTS

| | | | |
|---|---|---|---|
| 4,660,082 A | 4/1987 | Tomisha et al. | |
| 4,839,722 A | 6/1989 | Barry et al. | |
| 5,018,008 A * | 5/1991 | Asada | 358/518 |
| 5,111,286 A * | 5/1992 | MacDonald et al. | 358/500 |
| 5,212,546 A * | 5/1993 | Arazi et al. | 358/518 |
| 5,448,277 A | 9/1995 | Long | |
| 5,530,656 A | 6/1996 | Six | |
| 5,619,427 A * | 4/1997 | Ohkubo | 358/523 |
| 5,749,020 A | 5/1998 | Mestha et al. | |
| 5,825,984 A | 10/1998 | Mori et al. | |
| 5,903,796 A | 5/1999 | Budnik et al. | |

(Continued)

FOREIGN PATENT DOCUMENTS

| | | |
|---|---|---|
| EP | 0747853 | 12/1996 |
| EP | 0854638 | 7/1998 |
| JP | 1996-137146 | 5/1996 |
| JP | 09-204087 | 8/1997 |

OTHER PUBLICATIONS

Mestha, L.K.; Viturro, R.E.; Wang, Y.R.; Dianat. S.A.; Gray Balance Control Loop for Digital Color Printing Systems.

(Continued)

*Primary Examiner* — Mark Zimmerman
*Assistant Examiner* — Lawrence Wills
(74) *Attorney, Agent, or Firm* — Duane C. Basch; Basch & Nickerson LLP

(57) ABSTRACT

The present disclosure is directed to a system and method to render spatially uniform memory colors when images printed with CMYK primaries are not rendered uniformly due to output device quality errors. The disclosed method uses an array of sensors to scan a test image. Colors of interest are printed at the desired location first and then adjusted (iterated) to achieve a desired output quality. Iterations are carried out on the image on desired memory colors at the spatial resolution available in the measurement system. Colors of pixels are modified based on position where the pixels will be rendered, thereby compensating for any position/process related differences. Also disclosed is a process for incorporating modified memory colors before rendering, and the extension of memory color concepts to adjust colors for the uniform blocks (not edges), with uniformity defined by user definable thresholds.

11 Claims, 3 Drawing Sheets

(56) References Cited

U.S. PATENT DOCUMENTS

| | | | |
|---|---|---|---|
| 6,178,007 | B1 | 1/2001 | Harrington |
| 6,281,984 | B1 | 8/2001 | Decker et al. |
| 6,384,918 | B1 | 5/2002 | Hubble et al. |
| 6,538,770 | B1 | 3/2003 | Mestha |
| 6,690,471 | B2 | 2/2004 | Tandon et al. |
| 6,744,531 | B1 | 6/2004 | Mestha et al. |
| 6,975,949 | B2 | 12/2005 | Mestha et al. |
| 7,295,340 | B2 | 11/2007 | Mestha et al. |
| 7,307,752 | B1 | 12/2007 | Mestha et al. |
| 7,315,394 | B2 | 1/2008 | Klassen et al. |
| 7,333,208 | B2 | 2/2008 | Mestha et al. |
| 7,375,851 | B2 | 5/2008 | Mestha et al. |
| 7,383,261 | B2 | 6/2008 | Mestha et al. |
| 7,505,173 | B2 | 3/2009 | Viturro et al. |
| 7,800,779 | B2 | 9/2010 | Fan et al. |
| 7,940,434 | B2 * | 5/2011 | Inoue .................. 358/518 |
| 2002/0093684 | A1 | 7/2002 | Bares et al. |
| 2004/0136013 | A1 | 7/2004 | Mestha et al. |
| 2004/0141193 | A1 | 7/2004 | Mestha et al. |
| 2004/0165199 | A1 | 8/2004 | Klassen et al. |
| 2004/0252905 | A1 | 12/2004 | Mizes et al. |
| 2005/0030560 | A1 | 2/2005 | Maltz et al. |
| 2005/0057598 | A1 | 3/2005 | Endo et al. |
| 2005/0099446 | A1 | 5/2005 | Mizes et al. |
| 2007/0139734 | A1 | 6/2007 | Fan et al. |
| 2008/0037069 | A1 | 2/2008 | Mestha et al. |

OTHER PUBLICATIONS

Cheng, H; Fan, Z.; Background Identification Based Segmentation and Multilayer Tree Based Representation of Document Images; Proc. IEEE Intl, Conf. on Image Processing, ICIP, Rochester, NY; Sep. 2002.

Fan, Z. et al.; U.S. Appl. No. 10/866,850; Method for Image Segmentation to Identify Regions With Constant Foreground Color; filed Jun. 14, 2004.

Mestha et al.; U.S. Appl. No. 10/833,231; Full Width Array Scanning Spectrophotometer; filed Apr. 27, 2004.

Mestha et al.; U.S. Appl. No. 11/016,952; Full Width Array Mechanically Tunable Spectophotometer; filed Dec. 20, 2004.

Mestha et al.; U.S. Appl. No. 10/758,096; Reference Database and Method for Determining Spectra Using Measurements From an LED Color Sensor and Method for Generating a Reference Database; filed Jan. 16, 2004.

Mestha et al.; U.S. Appl. No. 10/248,387; Systems and Methods for Obtaining a Spatial Color Profile and Calibrating a Marking System; filed Jan. 15, 2003.

Mestha et al; U.S. Appl. No. 09/566,291; Online Calibration System for a Dynamically Varying Color Marking Device; filed May 5, 2000.

An unofficial prosecution history of US patent 7505173.

An unofficial prosecution history of US patent 7376272.

An unofficial prosecution history of US patent 6975949.

An unofficial prosecution history of US patent 7333208.

An unofficial prosecution history of US patent 7375851.

An unofficial prosecution history of US patent 7307752.

An unofficial U.S. Appl. No. 11/314,104, filed Dec. 21, 2005.

Rosenfeld, A.C et al.; Digital Picture Processing; Ch. 6; Academic Press 1982.

Hunt, R.W.G.; The Reproduction of Colour; Fountain Press, England; Ch 25, 26, 27, 28.

An unofficial Japanese Office Action for Japanese Patent Application 2006-343628 filed Dec. 20, 2006 (published Jul. 5, 2007 as JP2007-171967), corresponding to US Patent 7,800,779; Inventors Fan et al.

An unofficial summary translation of a Japanese Office Action for Japanese Patent Application 2006-343628 filed Dec. 20, 2006 (published Jul. 5, 2007 as JP2007-171967), corresponding to US Patent 7,800,779; Inventors Fan et al.

A machine translation of JP07-042084 filed Mar. 1, 1995 (Published May 31, 1996 as JP1996-137146); Inventors Kiyotaka et al.

JP2006-343628—An Unofficial Office Action of Jan. 10, 2012 (With English Summary) for Japanese Patent Application 2006-343628 Filed Dec. 20, 2006, Published Jul. 5, 2007, as 2007-171967; Inventor: Zhigang Fan et al. (Corresponding to US Patent 7,800,779).

An Abstract for JP JP09-204087 and Corresponding US Patent 5825984 as a Translation.

* cited by examiner

SYSTEM AND METHOD FOR DYNAMICALLY GENERATED UNIFORM COLOR OBJECTS

This application claims priority from U.S. Provisional Application No. 60/690,708, by R. E. Viturro et al., for a "SYSTEM AND METHOD FOR DYNAMICALLY GENERATED UNIFORM COLOR OBJECTS", filed Jun. 15, 2005, hereby incorporated by reference in its entirety.

CROSS-REFERENCE TO RELATED APPLICATIONS

Cross-reference is made to U.S. patent application Ser. No. 11/170,928 for a SYSTEM AND METHOD FOR SPATIAL GRAY BALANCE CALIBRATION METHODOLOGY USING HYBRID SENSING SYSTEMS, by R. Enrique Viturro et al., filed concurrently herewith, and hereby incorporated by reference for its teachings.

A system and method is disclosed to render spatially uniform memory colors, and more particularly, to adjust when images printed with CMYK primaries are not rendered uniformly due to output device quality errors.

BACKGROUND AND SUMMARY

Customers of high-quality printing systems and services demand the ability to reproduce their desired input images with accurate output (e.g., accurate color rendition) that does not significantly vary over time, among various rendering devices, or even spatially within the page. These considerations are more difficult to achieve with color rendering devices because of various image quality factors related to the state of the device, and more particularly, the print engine. Due to spatial non-uniformity errors, pixels with same color (CMYK mixture) printed in one part of an image may very well appear different when the same CMYK color mixture is used at another part of the printed page. The imaging, development and/or transfer subsystems of a print engine (including charging, development system wire history and wire contamination, charging subsystem variations and photoreceptor variations) are among many of the root causes for spatial non-uniformity errors in images. When memory colors those having a predefined color intent—for example "Xerox red" or "IBM blue") with a desired CMYK mixture are printed, we may get non-uniformity errors in the image, if the same memory color is rendered as multiple pixels side by side covering a reasonably large area in the page. Customers may wish to achieve consistency and predictability of those specific marked colors within the page as well as across pages and even across printers. Consistency with respect to time, accuracy to the desired input, and uniformity in the imaging of such colors enhance the distinguishing nature of memory colors and protect and maintain its integrity and value to more sophisticated customers.

In one embodiment, memory colors would be a new customer feature to select or specify on printers. Reference is made to the following patent and publications, which illustrate methods and systems for achieving consistency over time and across printers for in-gamut and out-of-gamut colors without addressing uniformity:

U.S. Pat. No. 6,744,531 to Mestha et al. for a COLOR ADJUSTMENT APPARATUS AND METHOD;

US Publication 20020093684 by Bares et al. for ACCURATE PRINTING OF PROPRIETARY MARK PATTERNS AND COLORS, filed Dec. 6, 2000; and US Publication 20050030560 by Maltz et al. for METHODS AND SYSTEMS FOR CONTROLLING OUT-OF-GAMUT MEMORY AND INDEX COLORS, filed Aug. 5, 2003.

Although methods have been proposed to obviate xerographic defects for single separation images, when colors are mixed, the defects are still visible and cannot consistently be overcome by those systems. US Patent Publications 20040252905, by Mizes et al. for SYSTEMS AND METHODS FOR COMPENSATING FOR PRINT DEFECTS, and 20050099446, by Mizes et al. for SYSTEMS AND METHODS FOR COMPENSATING FOR STREAKS IN IMAGES, are examples of such methods. More specifically, such systems do not show how to construct spatial inverse maps for memory colors, although an instance of such maps for memory colors at a macro level, over time, is believed to be understood.

In view of the noted problems, the present disclosure is directed to a method to render spatially uniform memory colors when images printed with CMYK primaries are not rendered uniformly due to print quality errors. The disclosed method uses an array of sensor to scan a test image across a process direction. Colors of interest are printed at the desired location first and then adjusted (iterated once or twice) to achieve the desired output quality. Iterations are carried out on the image on desired memory colors at the spatial resolution available in the measurement system. Colors of pixels are modified based on position where the pixels will be rendered, thereby compensating for any position/process related differences. Also disclosed in detail below is a process for incorporating modified memory colors before rendering, and the extension of memory color concepts to adjust colors for the uniform blocks (not edges), with uniformity defined by user definable thresholds. The effectiveness of the disclosed method was demonstrated via simulation for selected memory colors using computer models for prints from a Xerox iGen3 output engine.

Disclosed in embodiments herein is a method for dynamically generating a uniform color object in a printing system, comprising: identifying at least one memory color object from an image; using the image as an input, printing a test image; scanning the test image to produce scanned image data; extracting the memory color object from the scanned image data; and using the at least one memory color object and the scanned image data, generating an inverse spatial color map.

Also disclosed in embodiments herein is a method for consistent color generation on an image output device, comprising: identifying at least one memory color object from an image; using the image as an input, outputting a test image; scanning the test image to produce scanned image data; extracting the memory color object from the scanned image data; and using the at least one memory color object and the scanned image data, generating an inverse spatial color map for the output device.

Disclosed in embodiments herein is a system for consistent color generation, comprising: a source of image data, said data including at least one memory color object; a printer, responsive to the image data, for printing the at least one memory color object and producing an output print; a scanner for scanning the output print, said scanner producing an output including a plurality of color values generated from scanning the at least one memory color object; and a processor for receiving the color values and from said image data and said color values generating an inverse color map.

Figure 1:
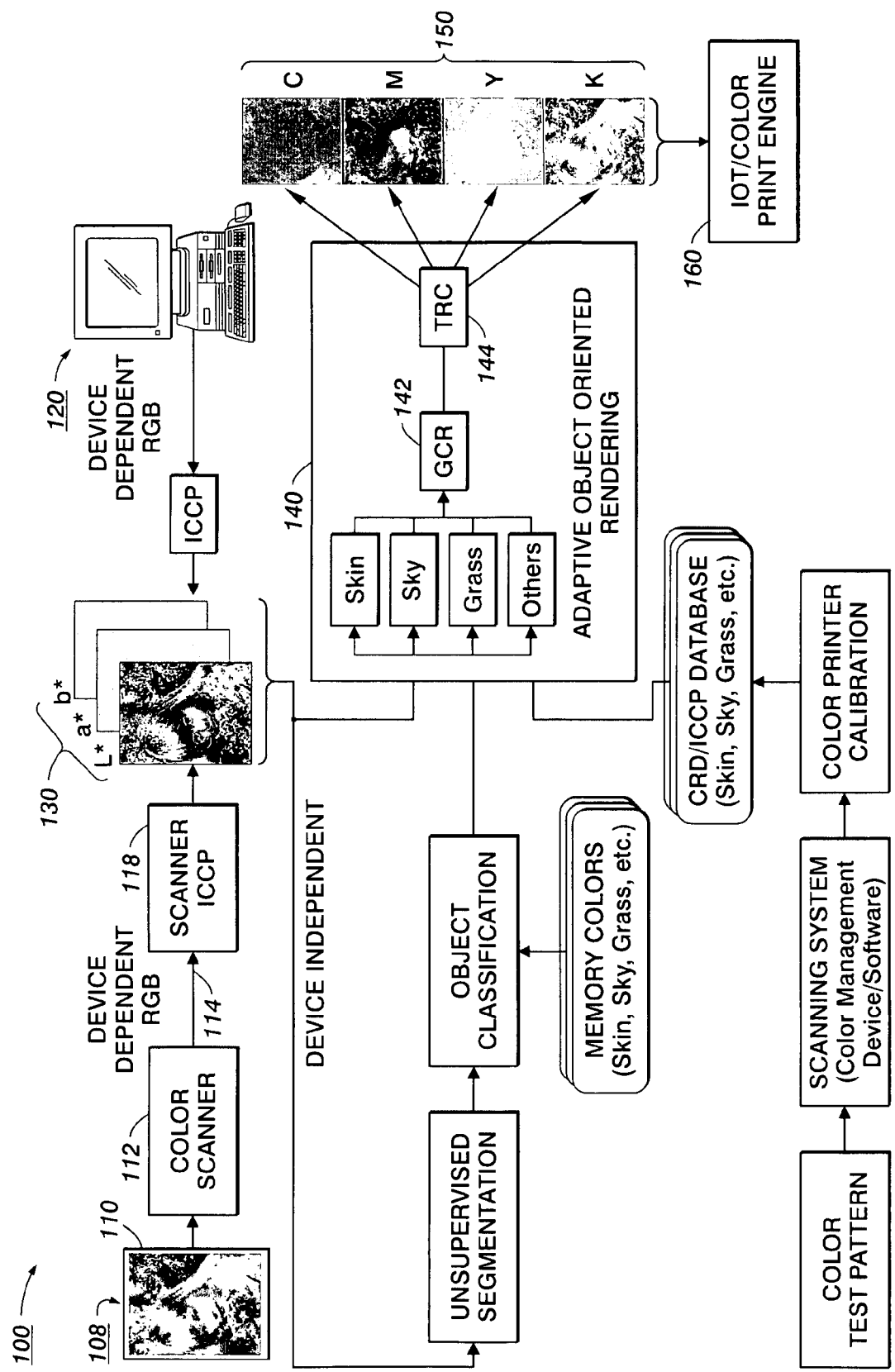
FIG. 1 is an illustration of an exemplary image path suitable for completing a disclosed method.

The following disclosure will be described in connection with a preferred embodiment, however, it will be understood that there is no intent to limit the invention to the embodiment(s) described. On the contrary, the intent is to cover all alternatives, modifications, and equivalents as may be included within the spirit and scope of the disclosure and as defined by the appended claims.

DETAILED DESCRIPTION

For a general understanding of the following disclosure, reference is made to the drawings. In the drawings, like reference numerals have been used throughout to designate identical elements. In describing the system and method, the following term(s) have been used in the description.

An "image input device" or terminal (IIT) is a device that can receive an image and provide an item of data defining a version of the image. A "scanner" is an image input device that receives an image by a scanning operation, such as by scanning a document.

An "image output device" or terminal (IOT) is a device that can receive an item of data defining an image and provide the image as output. A "display" is an image output device that provides the output image in human viewable form. The visible pattern presented by a display is a "displayed image" or simply "image." A printer (e.g., xerographic/laser, inkjet, etc.) is an image output device that provides the output in a human viewable form on a substrate or other removable media.

For the purpose of this disclosure, FIG. 1 illustrates a typical image path used for processing special sections of the image objects. Image path 100 uses, in one process, a scanner path 108 to scan (scanner 112) the RGB pixels 114 of the image 110 to be printed. The RGB signals from the scanner 112 are converted using International Color Consortium Profiles (ICCP) 118 to produce color separation 130. If the scanner path is not used, then images are created electronically as shown schematically by a PC 120, often remotely as in a modern digital production environment. In accordance with the method employed herein, the pixel data is pre-processed to produce device independent color separations or images (e.g., L*a*b*) 130, and the device independent electronic images 130 are intercepted at the input point to the adaptive object oriented rendering module 140. This module is also called the raster image processor or RIP. In rendering module 140, the device independent image data 130, object classification data and color rendering dictionary (CRD) data is processed to produce the CMYK separations 150 sent to the IOT or print engine 160. Although other processes may be included in rendering module 140, gray component replacement (GCR) 142 and the application of tone reproduction curves (TRC) 144 to produce the CMYK output are at least some of the functions performed.

As indicated in the figure, scanned images have pixels described in RGB color coordinates. They go through a transformation to device independent space (L*a*b*) using the scanner ICC profile look-up tables (LUTs) 118. Similarly, the RGB images from the electronically prepared documents go through the transformation to device independent space using static color transforms such as the ICC profile LUT supplied by the application vendor. Most print shops use scanners in some portion of their workflows. The image segmentation, such as disclosed in U.S. application Ser. No. 10/866,850 by Fan et al., for a METHOD FOR IMAGE SEGMENTATION TO IDENTIFY REGIONS WITH CONSTANT FOREGROUND COLOR, hereby incorporated by reference in its entirety, and object classifications are applied to device independent pixels to enable processing of each object differently in the RIP.

For example, a Xerox red pixilated design "X", the lined design IBM blue, the Owens-Corning "pink" or the PEPSI fanciful design are some of "famous" marks and recognizable patterns or colors that would be expected to be developed uniformly. Such colors may be classified as specific memory colors with index values whose desired color values are known in terms of L*a*b* coordinates. Moreover, specific customer selectable colors can also be very important and the desire would be to print them accurately across different printer populations. They can also be grouped and indexed. Such objects are classified within a known entity also contain location information where the pixels are to be developed. These color objects are processed differently using identifiable LUTs in the RIP. After transformation, colors of these objects are now in CMY—a device dependent space. CMY values of each pixel are further color separated to CMYK in GCR/UCR modules, and these four color separations go through transformations with print-engine specific tonal reproduction curves (TRCs; such as gray balanced TRC or single separation, linearization TRCs), halftoning and then to an exposure station of a print engine. The methods disclosed herein are directed at, in at least one embodiment, intercepting the classified objects and performing remapping of their color values with calculated values obtained using the described controls.

The remapped color tables are also called inverse maps for the purpose of this disclosure. These inverse maps used for memory color objects could be in L*a*b* to L*a*b* space, in CMY to CMY space, in L*a*b* to CMY space, in CMYK to CMYK space, or CMYK to L*a*b* space. For simplicity, the disclosure herein uses CMY color space. The method adjusts colors for the memory color or uniform blocks (not edges), with uniformity defined by a user definable threshold. In other words, a user might specify the range of pixel color variation that is acceptable, perhaps via identification of acceptable colors in a region on the image. This implies that for a uniform object, the pixels that are close to the object boundaries may not be corrected. Although the method is proposed for color correction for uniform areas, it can be extended to other parts of the images, such as slowly varying regions and textured regions. The follow description is directed to some of the key steps involved in generating the spatial inverse color maps for uniform color objects.

Figure 2:
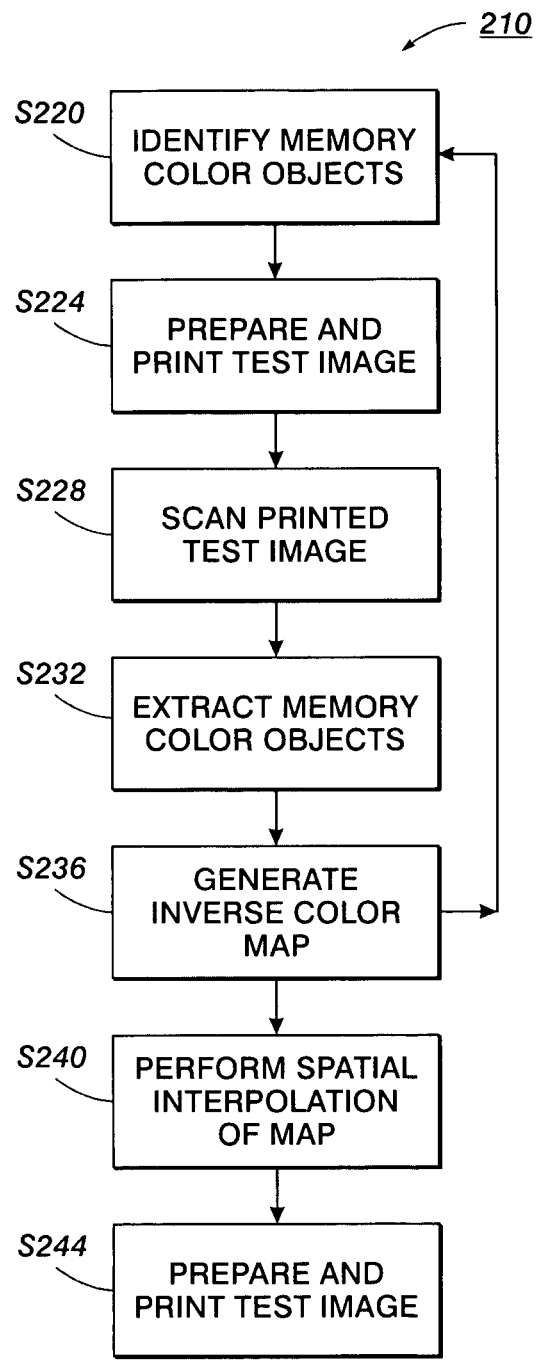
FIG. 2 is a flow diagram depicting the method disclosed herein.

The method employed for achieving uniform colors using array sensing and controls is a multi-step method as described below, and as generally depicted in FIG. 2 (method 210).

As depicted at S220, the first operation is to identify memory color objects from the document using segmentation and classification algorithms, such as those described in U.S. application Ser. No. 10/866,850 by Fan et al., as identified above, and by H. Cheng and Z. Fan in "Background Identification Based Segmentation and Multilayer Tree Based Representation of Document Images", Proc. IEEE Intl. Conf. on Image Processing, ICIP, Rochester, N.Y., September 2002, which is also incorporated herein by reference for its teachings. In addition to the automated image segmentation and classification methods that may be employed to identify memory color objects or regions, the method at S220 further contemplates a customer or user identifying the memory colors/or uniform color objects well before printing begins. It will be appreciated by those knowledgeable in the area of image processing that typical workflows may contain this step while performing image processing for object oriented rendering. Accordingly, identifying at least one memory color object comprises segmenting the image into a plurality of discrete segments, classifying the segments, and using the classifications to identify at least one memory color.

Next at S224, a test image is prepare and printed based upon the input image—where the input image includes a memory color. The test image should contain the memory color objects to be rendered, and preferably at the desired location on the output page. The original electronic image can also be used as the test image.

At S228, the test image is scanned using a sensor, the sensor and associated processing hardware producing scanned image data. In one embodiment, a full width RGB scanner may be employed to digitize the test print. Alternatively, a full width array spectrophotometer, with sufficient spatial resolution, may be employed for the scanning operation. Such a spectrophotometer is disclosed in U.S. application Ser. No. 10/833,231 for a FULL WIDTH ARRAY SCANNING SPECTROPHOTOMETER by L. K. Mestha et al., filed Apr. 27, 2004, and U.S. application Ser. No. 11/016,952 for a FULL WIDTH ARRAY MECHANICALLY TUNABLE SPECTROPHOTOMETER, by L. K. Mestha, filed Dec. 20, 2004, both of which are hereby incorporated by reference. Uniformity, at a small spatial scale, is affected depending on the spatial resolution of the measurement and control system. Scratched or isolated deletions or random white spots within the image may not be improved by the disclosed system and method. Color uniformity is affected, if the spatial measurement and control bandwidth is maintained to better than photographic response limits (approx. >150 dpi). In S228, the scanned data is pixilated and may also be associated with location identifiers to maintain the spatial reference. Furthermore, color values for each pixel are transformed to device independent form using sensor LUTs such as ICC Profiles as described above, or spectral to L*a*b* transformations and stored for use in later steps.

Continuing with FIG. 2, S232 represents the extraction of the memory color objects from the scanned image data. It will be appreciated that it may be possible to use the various methods indicated in S220 for this purpose. In other words, conventional image segmentation and/or classification processes can be employed to identify and extract the memory color objects or regions of the image.

Using the at least one memory color object and the scanned image data, an inverse spatial color map is generated at S236. To perform this operation, one embodiment executes a control algorithm on the measured memory color objects to obtain inverse spatial color maps as described below. Exemplary algorithms are described in detail in the following paragraphs. Obtaining inverse spatial maps is likely based on several iterations. Hence the process in S220-S236 may have to be repeated two or more times depending on the variability of the print engine. The algorithm described below requires parameters which are determined offline. For example, clustered Jacobian matrix, cluster centers of the input-output printer characterization LUTs, gain matrix, interpolation constants, image thresholds, iteration thresholds etc., are some of the parameters required for the algorithm to provide suitable correction and control.

At S240 the method performs spatial interpolation of the inverse maps obtained in S236 by using two-dimensional interpolation methods to match the full size of the image. In other words, the spatial resolution of the scanned image data may be such that interpolation (see e.g., FIG. 3) is required, to accurately characterize and correct the image pixel having a particular memory color. Although various interpolation methods may be employed, A. Rosenfeld, A. C. Kak, in "Digital Picture Processing," Ch. 6, Academic Press Inc., 1982, describe some examples of spatial interpolation processing. In the following description a bilinear spatial interpolation algorithm is characterized. It should also be noted that spatial interpolation is not required if the measurement resolution is higher than the image resolution. Once interpolated, S244 represents updating of the memory color objects in the image with the spatial inverse maps created in S240.

Having generally described the various operations performed by the system of FIG. 1 in accordance with method 210, attention is now turned to a more detailed description of the algorithm used in developing uniform memory color objects. First, for the spatial control model & feedback, it should be understood to be difficult to construct a two-dimensional control model that captures the dynamic behavior of the printer. For the purpose of developing uniform memory colors the dynamic behavior of the system is represented approximately using a first order linear time invariant finite difference (discrete) matrix equation with the printer Jacobian. The difference equation would depend on the print number and the measured pixel location. Such relationships are characterized in, for example, "Gray Balance Control Loop for Digital Color Printing Systems," by L. K. Mestha et al., to be presented at NIP21 International Conference on Digital Printing Technologies (September 2005). As the measurements are performed on a reduced measurement grid, the region around the measurement grid points would be defined as the pixel of interest for the difference equation.

For simplicity, consider a CMY to L*a*b* printer, where the input CMY values are digital values in the range of 0 to 255. If k is the print number (more appropriately called iteration number), 'i' and 'j' as pixel locations respectively in the scan and process directions, then the open-loop, linearized printer model can be written in terms of the Jacobian matrix. The Jacobian is the sensitivity matrix, which is the first derivative of the printer input-output performance. As described relative to method 210, inputs to the printer are considered at the point where the memory colors are processed. For example, if the memory colors are already in CMY color space, then the system would use the Jacobian between the output L*a*b* values and the input CMY values. On the other hand, if the input values are in L*a*b* (already mapped to the interior of the gamut if the L*a*b* values of the memory colors are out-of-gamut) a Jacobian between the output L*a*b* values and the input L*a*b* values are used. For a macro pixel element, a description of the linear control model may be found in US Patent Publication 2004-0141193 by Mestha et al. for STATE-SPACE BASED MODELING OF PIXEL ELEMENTS OF A DYNAMICALLY VARYING COLOR MARKING DEVICE, which is hereby incorporated by reference in its entirety. The present model is extended to spatial control by redefining the pixel element to a region corresponding to the measurement aperture, which may be higher or lower than the actual image resolution. The linear state model of the open loop printer is then given by:

$$x_{ij}(k+1) = B_{ijc}Q_{ij}(k) + x_{ij}(0) \qquad \text{Eq. (1)}$$

where, $$x_{ij} = \begin{bmatrix} L^* \\ a^* \\ b^* \end{bmatrix}_{ij}, \quad \underline{Q}_{ij} = \begin{bmatrix} \delta C \\ \delta M \\ \delta Y \end{bmatrix}_{ij}, \quad \underline{B}_{ijc} = \begin{bmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{bmatrix}_{ijc} \quad \text{Eq. (2)}$$

$$x_{ij}(0) = \begin{bmatrix} L^* \\ a^* \\ b^* \end{bmatrix}_{ij} \text{ values for nominal } CMY. \quad \text{Eq. (3)}$$

The described method considers a piece-wise linear model of the printer enabled by developing an input-output cluster a priori. Clustering is done by using a K-means algorithm as disclosed in U.S. patent application Ser. No. 10/758,096 by Mestha et al. for a REFERENCE DATABASE AND METHOD FOR DETERMINING SPECTRA USING MEASUREMENTS FROM AN LED COLOR SENSOR AND METHOD FOR GENERATING A REFERENCE DATABASE, filed Jan. 16, 2004. Shown in Eq. (2) is a pixilated spatial (i,j) Jacobian matrix with parameter 'c' in the model to denote the cluster. In the simulations described below, a constant Jacobian matrix was used, although in reality, it depends on the color and the pixel location. However, only an approximate Jacobian matrix is required, since the matrix is used to set the number of iterations required for convergence. Improved accuracy will make the loop converge faster—i.e., with fewer iterations.

A closed loop state model is obtained by introducing the controller. In one embodiment a gain matrix and an integrator are employed in the controller, the operation of which may be completed as part of the adaptive rendering system 140 in FIG. 1. The gain matrix is calculated using the pixilated Jacobian matrix. Here, the multivariable gain and the integrator become the compensator of error-processing block for the closed loop system.

$$E_{ij} = \begin{bmatrix} L^* \\ a^* \\ b^* \end{bmatrix}_{\substack{memory \\ color}} - \begin{bmatrix} L^* \\ a^* \\ b^* \end{bmatrix}_{ij} \quad \text{Eq. (4)}$$

The integrator equation is shown below.

$$\underline{Q}_{ij}(k) = \underline{Q}_{ij}(k-1) + \underline{u}_{ij}(k) \quad \text{Eq. (5)}$$

Now the closed loop state model of the controller for uniform memory color is given by:

$$\underline{x}_{ij}(k+1) = \underline{A}\underline{x}_{ij}(k) + \underline{B}_{ijc}\underline{u}_{ij}(k) \quad \text{Eq. (6)}$$

$$\underline{u}_{ij}(k) = -\underline{K}_{ij}\underline{E}_{ij}(k) \quad \text{Eq. (7)}$$

with, A=diag[1 1 1], $\underline{K}_{ij} = -\sigma_{ij}\underline{B}_{ijc}^{-1}$ and $\underline{E}_{ij}$ as the pixilated error vector between the desired memory color and the measured memory color.

After convergence, the spatial inverse map is represented by the following vector:

$$\underline{V}_{ij} = \underline{Q}_{ij} + \begin{bmatrix} C \\ M \\ Y \end{bmatrix}_{\substack{Memory \\ Color}} \quad \text{Eq. (8)}$$

Figure 3:
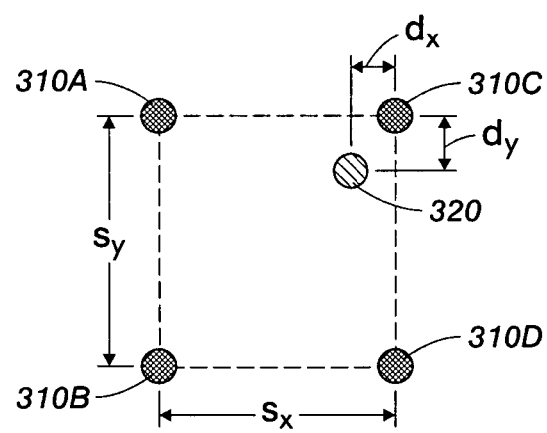
FIG. 3 is an illustration of a matrix representing measurement grid points relative to an actual pixel location as employed in the method disclosed.

Although Eq. 8 gives the required spatial inverse map, its resolution may not be enough when a sensor with a reduced measurement grid is used. When the measurements are performed on a reduced resolution grid, spatial interpolation is necessary to achieve full resolution correction, and a pre-filtering step may be applied to avoid aliasing (blocking artifacts). Generally speaking, any low-pass filters with a cutoff frequency of 0.5× Nyquist Frequency will provide reasonable pre-filtering results. In the disclosed control algorithm, a bi-linear interpolation is proposed. The value of a pixel at position (m,n which is different from i,j) (shown in FIG. 3 as the hashed spot 320) is determined by the values of the four neighboring inverse nodes ($V_{ij}$ in Eq. 8) at the measurement grid points. Specifically, $\underline{V}_{mn}$, is evaluated as:

$$\underline{V}_{mn} = \alpha\beta\underline{V}_{ij} + \alpha(1-\beta)\underline{V}_{(i+1)j} + (1-\alpha)\beta\underline{V}_{i(j+1)} + (1-\alpha)(1-\beta)\underline{V}_{(i+1)(j+1)} \quad \text{Eq. (9)}$$

where $\underline{V}_{ij}$, $\underline{V}_{(i+1)j}$, $\underline{V}_{i(j+1)}$, $\underline{V}_{(i+1)(j+1)}$ are the top left, bottom left, top right, and bottom right inverse nodes obtained from the measurement grid points, respectively, (shown in FIG. 3 as the solid black spots 310A, 310B, 310C and 310D). Also, the constants are calculated using the equation shown below, $$\alpha = d_x/s_x \quad \text{Eq. (10)}$$

$$\beta = d_y/s_y \quad \text{Eq. (11),}$$

with $s_x$, $s_y$, $d_x$, and $d_y$ being the spatial distances shown in FIG. 3.

As noted above relative to S220, the method requires the segmentation and memory color classification of the image. Algorithms exist for segmenting images and locating areas of uniform color. Many of the methods can be directly used for this particular application. However, these techniques tend to be complicated and demand significant amount of computation and memory resources. A simple block based segmentation and classification method is proposed here for use in this method. In particular, the image is first divided into disjoint rectangular blocks, each with a size of $s_x \times s_y$ and centered at one of the measurement grid points. For each block, the color variation is evaluated and compared to a threshold color value. A block is considered to be uniform, if its variation is small enough and well within the threshold. Otherwise, it is declared non-uniform. The variation can be evaluated using the color variance, the color range (maximum-minimum), measurements or perception based on neighborhood colors.

The disclosed method adjusts colors for the uniform blocks (not edges), with uniformity defined by the threshold. This implies that for a uniform object, the pixels that are close to the object boundaries may not be corrected. Practically, it is believed that such a limitation will not cause any perceptible artifacts. If the block size is relatively small, then the boundary areas are also small. Moreover, human visual systems are less sensitive to non-uniformity if it occurs close to an edge, as a result of masking effects. Although the disclosed method is described relative to color correction in uniform areas, it will be appreciated that it may also be extended to other parts of the images, such as slowly varying regions and textured regions.

The system and methods described herein can render spatially uniform colors with reduced uniformity errors. We have shown how to determine the spatial inverse maps at full image resolution. This method is an extension of the temporal control methods patented by same inventors for achieving consistent image quality with time using inline spot color sensors. To achieve spatial consistency, we require the use of full color measurements at multiple spots and spatial control models, not covered in earlier patents. The proposed method adjusts colors for the uniform blocks (not edges), with uniformity defined by the thresholds. Although the method is proposed for color correction for uniform areas, it can be extended to other parts of the images, such as slowly varying regions and textured regions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for dynamically generating a uniform color object in a printing system, comprising:
   identifying at least one memory color object from an image, including segmenting the image into a plurality of discrete segments, classifying the segments, and using the classifications to identify at least one memory color;
   using the image as an input, printing a test image;
   scanning the test image to produce scanned image data;
   extracting the memory color object from the scanned image data;
   using the at least one memory color object and the scanned image data, generating an inverse spatial color map;
   performing a spatial interpolation of the inverse map using a two-dimensional interpolation to match a larger image resolution; and
   updating data for the memory color object in the image using the spatial inverse map prior to printing.

2. The method of claim 1, wherein generating an inverse spatial color map further includes modeling a dynamic behavior of the printing system using a first order linear time invariant finite difference equation, where the difference equation depends on at least a print number and a measured pixel location.

3. The method of claim 2, wherein said difference equation is characterized in terms of a Jacobian matrix, and where said Jacobian matrix is a sensitivity matrix.

4. The method of claim 2, wherein a closed-loop model is employed to characterize the dynamic behavior of the printing system.

5. The method of claim 1, wherein scanning the test image comprises scanning at least a portion of the image with an array spectrophotometer.

6. A method for consistent color generation on an image output device, comprising:
   identifying at least one memory color object from an image, including segmenting the image into a plurality of discrete segments, classifying the segments, and using the classifications to identify at least one memory color;
   using the image as an input, outputting a test image;
   scanning the test image to produce scanned image data;
   extracting the memory color object from the scanned image data;
   using the at least one memory color object and the scanned image data, generating an inverse spatial color map for the output device;
   performing a spatial interpolation of the inverse map using a two-dimensional interpolation to match a larger image resolution; and
   updating data for the memory color object in the image using the spatial inverse map prior to printing.

7. The method of claim 6, wherein generating an inverse spatial color map further includes modeling a dynamic behavior of the printing system using a first order linear time invariant finite difference equation, where the difference equation depends on at least a print number and a measured pixel location.

8. The method of claim 7, wherein said difference equation is characterized in terms of a Jacobian matrix, and where said Jacobian matrix is a sensitivity matrix.

9. The method of claim 7, wherein a closed-loop model is employed to characterize the dynamic behavior of the printing system.

10. A method for dynamically generating a uniform color object in a printing system, comprising:
    identifying at least one memory color object from an image, including segmenting the image into a plurality of discrete segments, classifying the segments, and using the classifications to identify at least one memory color;
    using the image as an input, printing a test image;
    scanning the test image to produce scanned image data;
    extracting the memory color object from the scanned image data;
    using the at least one memory color object and the scanned image data, generating an inverse spatial color map;
    determining if a measurement resolution is less than the image resolution, and only if so performing a spatial interpolation of the inverse map using a two-dimensional interpolation to match a larger image resolution; and
    updating data for the memory color object in the image using the spatial inverse map prior to printing.

11. The method of claim 6, further comprising:
    determining if a measurement resolution is less than the image resolution, and only if so performing a spatial interpolation of the inverse map using a two-dimensional interpolation to match a larger image resolution; and
    updating data for the memory color object in the image using the spatial inverse map prior to printing.

* * * * *